US011538188B1

(12) United States Patent
Cejka et al.

(10) Patent No.: US 11,538,188 B1
(45) Date of Patent: Dec. 27, 2022

(54) METHODS FOR SPATIAL CALIBRATION OF VEHICLE ADAS SERVICE SYSTEM

(71) Applicant: Hunter Engineering Company, Bridgeton, MO (US)

(72) Inventors: Brian M. Cejka, Des Peres, MO (US); Daniel R. Dorrance, Ballwin, MO (US); Asher L. Haggard, St. Louis, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 377 days.

(21) Appl. No.: 16/894,162

(22) Filed: Jun. 5, 2020

Related U.S. Application Data

(60) Provisional application No. 62/857,577, filed on Jun. 5, 2019.

(51) Int. Cl.
 *G06T 7/80* (2017.01)
 *G01M 17/00* (2006.01)

(52) U.S. Cl.
 CPC .............. *G06T 7/80* (2017.01); *G01M 17/00* (2013.01); *G06T 2207/10028* (2013.01); *G06T 2207/30252* (2013.01)

(58) Field of Classification Search
 CPC ............. G06T 7/80; G06T 2207/10028; G06T 2207/30252; G01M 17/00
 See application file for complete search history.

(56) References Cited

U.S. PATENT DOCUMENTS

| 7,583,372 | B2 * | 9/2009 | Shylanski | ............... G06T 7/593 |
| | | | | 356/139.09 |
| 8,448,342 | B2 * | 5/2013 | Nobis | ................ G01B 11/2755 |
| | | | | 33/203.18 |
| 9,528,822 | B2 | 12/2016 | Stieff | |
| 10,634,488 | B2 | 4/2020 | Stieff et al. | |
| 10,921,426 | B2 * | 2/2021 | Tang | .......................... G01S 7/40 |
| 11,397,080 | B2 * | 7/2022 | Leikert | ............. G01B 11/2755 |
| 2005/0068522 | A1 * | 3/2005 | Dorrance | ........... G01B 11/2755 |
| | | | | 356/139.09 |
| 2005/0096807 | A1 * | 5/2005 | Murray | .............. G01B 11/2755 |
| | | | | 33/288 |
| 2009/0169052 | A1 * | 7/2009 | Seki | .......................... G06T 7/74 |
| | | | | 348/148 |

(Continued)

FOREIGN PATENT DOCUMENTS

WO 2018067354 A1 4/2018

*Primary Examiner* — Molly Wilburn
(74) *Attorney, Agent, or Firm* — Sandberg Phoenix & von Gontard PC

(57) ABSTRACT

A method and apparatus for calibrating a projection axis orientation for an optical projector associated with a vehicle inspection or service system so as to enable projection of indicia onto selected spatial locations within a vehicle service area. Projector axis orientations required for the projection of visible indicia onto reference targets disposed at determinable locations within a common coordinate system of the vehicle service area are utilized to establish a relationship utilized to mathematically transform between selected spatial coordinate locations for projected indicia and corresponding orientations of the projection axis, facilitating projection of the visible indicia to additional spatial coordinate locations within the common coordinate system.

22 Claims, 11 Drawing Sheets

(56) References Cited

U.S. PATENT DOCUMENTS

| | | | |
|---|---|---|---|
| 2010/0274514 A1* | 10/2010 | Kamachi | G01B 21/26 |
| | | | 702/94 |
| 2013/0110314 A1* | 5/2013 | Stieff | G01B 11/275 |
| | | | 701/1 |
| 2016/0291160 A1* | 10/2016 | Zweigle | G01S 7/4813 |
| 2018/0052223 A1* | 2/2018 | Stieff | G05D 1/0257 |
| 2018/0092613 A1* | 4/2018 | Ancar | A61B 6/487 |
| 2019/0249985 A1* | 8/2019 | Stieff | G01B 11/272 |
| 2020/0074675 A1 | 3/2020 | Cejka et al. | |
| 2022/0073326 A1* | 3/2022 | Elliott | B66F 13/00 |
| 2022/0113259 A1* | 4/2022 | Rueb | G01N 21/8806 |

\* cited by examiner

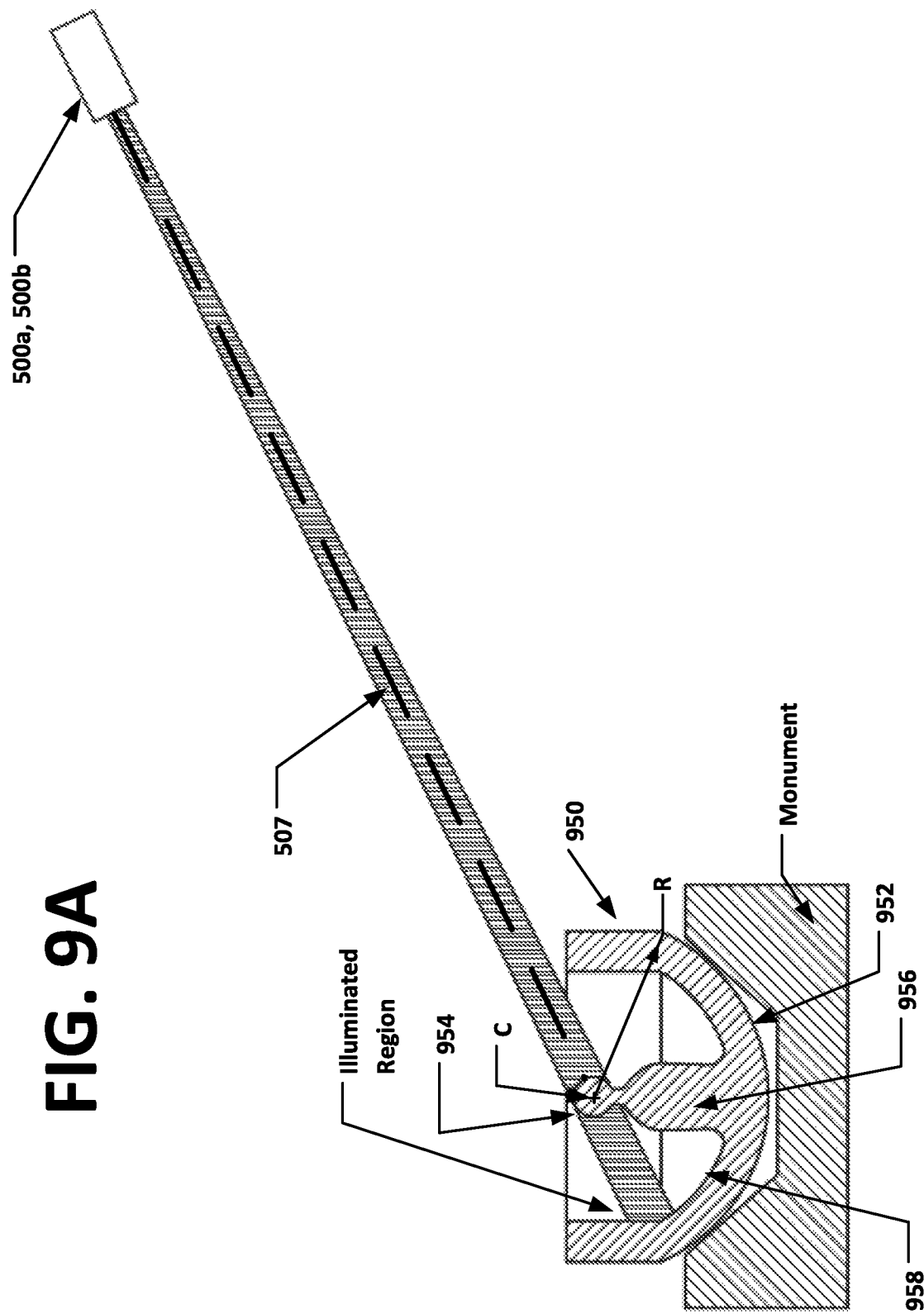

METHODS FOR SPATIAL CALIBRATION OF VEHICLE ADAS SERVICE SYSTEM

CROSS-REFERENCE TO RELATED APPLICATIONS

The present application is related to, and claims priority from, U.S. Provisional Patent Application Ser. No. 62/857,577 filed on Jun. 5, 2019, and which is herein incorporated by reference.

STATEMENT REGARDING FEDERALLY SPONSORED RESEARCH

Not Applicable.

BACKGROUND OF THE INVENTION

The present application sets forth methods for calibrating projection components of a vehicle service system utilized to direct placement of vehicle service elements in spatial proximity to a vehicle undergoing an ADAS inspection or recalibration, and in particular, to methods for calibrating an orientation of a projection axis of one or more optical projectors associated with a vehicle service or inspection system over a range of movement.

Inspection or calibration of various vehicle ADAS sensors, such as radar units or optical sensors, often requires specialized structures to be precisely positioned in proximity to the vehicle undergoing service. While this precise positioning may be accomplished manually, it is often easier, faster, and more precise to position the structures with the aid of a vehicle service system, such as a vehicle wheel alignment measurement or an ADAS sensor inspection/service/calibration system.

Vehicle service systems, including wheel alignment measurement systems and vehicle ADAS sensor inspection/service/calibration systems employing machine vision technology such as cameras to observe optical targets mounted on various surfaces, are well known in the vehicle measurement, alignment, and inspection industry. Typically, these types of vehicle service systems employ multiple cameras, mounted to a fixture or structure located in front of a vehicle service area. The cameras are oriented such that when a vehicle is present within the service area, each wheel of the vehicle (or target mounted thereon) is visible to at least one of the cameras, enabling the vehicle service system to determine a relative spatial position and an orientation of the vehicle and/or objects in proximity thereto. The fixture or structure supporting the cameras may be mobile, configured to move from one service area to another, or to reposition within the service area as needed. The camera mounting fixture or structure may be vertically (and/or rotationally) adjustable to orient camera fields of view to accommodate vehicles at different elevations of a lift rack within the vehicle service area. Images acquired by the cameras are conveyed to a processing system configured with suitable software instructions for image evaluation and for determining various spatial measurements associated with observed surfaces, objects, or targets. An exemplary vehicle inspection system is shown for use in realignment or recalibration of an onboard vehicle ADAS sensor in published International Patent Application No. WO 2018/067354 A1 to Hunter Engineering Company.

By including at least one optical projector on a camera-mounting crossbeam to project visible indicia, such as a laser spot, along a orientable projection axis onto a surface in proximity to the system, a vehicle service or inspection system may be utilized to guide relative placement of vehicle service components in proximity to the vehicle undergoing service. Once the relative location of a vehicle within the service area is established by the processing system, such as by utilizing images of targets or other features acquired by the cameras, the relative locations for placement of the vehicle service components, with a common coordinate frame of reference may be determined by calculating relative spatial relationships. Ideally, the optical projectors are oriented by the processing system to project indicia to the various locations for placement of the specialized structures during inspection or calibration of vehicle onboard ADAS components. However, due to inherent variables associated with the design of motorized gimbals, turrets, or other means for adjusting the orientation of the projection axis, the projected indicia may not precisely align with the intended placement location when an optical projector is orientated in response to specific commands from the processing system.

Accordingly, in order to ensure correct placement of the specialized structures, such as targets or fixtures, at the intended locations, there is a need to calibrate the movement of the optical projectors about each available orientation axis when responding to commands from the processing system, ensuring that the projected indicia intersects the intended locations.

BRIEF SUMMARY OF THE INVENTION

Accordingly, the present disclosure sets forth a method for calibrating components of a vehicle service or inspection system, and in particular, for calibrating controlled movement of one or more optical projectors to align associated projected indicia with selected spatial locations to within an acceptable tolerance. In an uncharacterized environment, the calibration method initially requires placement of front and rear calibration fixtures in a spaced apart and aligned relationship. The fixtures are placed within a forward-looking field of view of a set of cameras associated with the vehicle inspection system. Images of optical targets associated with each calibration fixtures acquired by the cameras are evaluated by a processing system to determine relative spatial relationships between each of the calibration fixtures and the vehicle inspection system within a common frame of reference. Without altering a relationship between the vehicle inspection system and the calibration fixtures, each optical projector is controlled by the processing system to align an associated projected indicia with calibration points on the rear calibration fixture from the vehicle inspection system. A first set of calibration parameters are established from the determined spatial relationships and the movement of each optical projector required to align the projected indicia and calibration points. Next, the vehicle inspection system is repositioned to a location between the calibration fixtures, and rotated 180 degrees, so that the forward-looking field of view for the set of cameras is encompassing only the front calibration fixture. Images of optical targets associated with the front calibration fixture are acquired by the cameras and evaluated by the processing system to determine a new spatial relationship between each of the calibration fixtures and the vehicle inspection system. Without altering the new relationship between the vehicle inspection system and the calibration fixtures, each optical projector is controlled by the processing system to again align an associated projected indicia with the calibration points on the rear calibration fixture, which is now located behind the vehicle inspection system. A second set of calibration parameters is established from the determined spatial relationships and the movement of each optical projector required to align the projected indicia with the calibration points. The first and second set of calibration parameters are evaluated by the processing system to establish a six-degree of freedom (6-DOF) transformation describing an optimized orientation of each optical projector required to project visible indicia to any spatial location within the common frame of reference encompassing the first and second calibration fixtures.

In a further embodiment of the present disclosure, a calibration fixture for use during calibration of an optical projector on a vehicle inspection system is provided. The calibration fixture consists of a pair of support legs, and a rotating transverse bar supported within an outer support tube secured between the support legs. A hub for receiving an optical target is secured to each end of the rotating transverse bar, such that sensors or optical targets mounted to each hub are maintained in axial alignment at opposite ends of the rotating transverse bar. A target plate is secured between the pair of support legs, providing a planar surface having a plurality of visible reference points. An elongated planar calibration scale is pivotally mounted to each support leg for rotational movement between a horizontal orientation parallel to the transverse bar, and a vertical orientation. Each planar calibration scale includes a plurality of visible reference points spaced in a linear configuration.

In a further embodiment, the present disclosure sets forth a double-sided optical target. Each double-sided optical target includes a set of optical features visible to an observing camera system disposed in a first position, and a second set of optical features visible to an observing camera disposed in a second position on a generally opposite side of the target from the first position. A spatial relationship between the first and second sets of optical features is known or determined, such that a spatial relationship between the observing camera systems at each position is determinable from acquired images of the stationary double-sided optical target.

In a further embodiment, the present disclosure sets forth a spherical reference target configured to aid in the calibration of an optical projector of a vehicle inspection system. The target consists of a spherical body having a known diameter, from which a hemi-spherical cap, having a height which is less than a radial dimension of the spherical body, is removed to define a flat plane. A reflective surface is provided on the flat plane, with a visible reference mark aligned with a radial axis of the spherical body. The reflective surface and visible reference mark are configured such that a beam of light orthogonally reflected from the reference mark on the reflective surface is radially aligned with the center of the spherical body.

In a further embodiment, the present disclosure sets forth a reference target configured to aid in the calibration of an optical projector of a vehicle inspection system. The target object consists of an outer concentric element, an inner concentric element, and a pillar coupled there between. The outer concentric element defines a hollow base segment having a hemispherical outer surface of a known radial dimension, terminating at a planar face. The coupling pillar extends radially from the planar face towards a radial center point of the outer concentric element, coaxial with a surrounding cylindrical ring extending from the planar face. The inner concentric element, coupled to the planar face of the outer concentric element by the radial pillar, defines a spherical object surrounding the center point of the reference target object.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 9A is a cross-sectional view of an alternate target object of the present disclosure for use during calibration of the multi-axis gimbal optical projectors, illustrating illumination and shadowing;

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
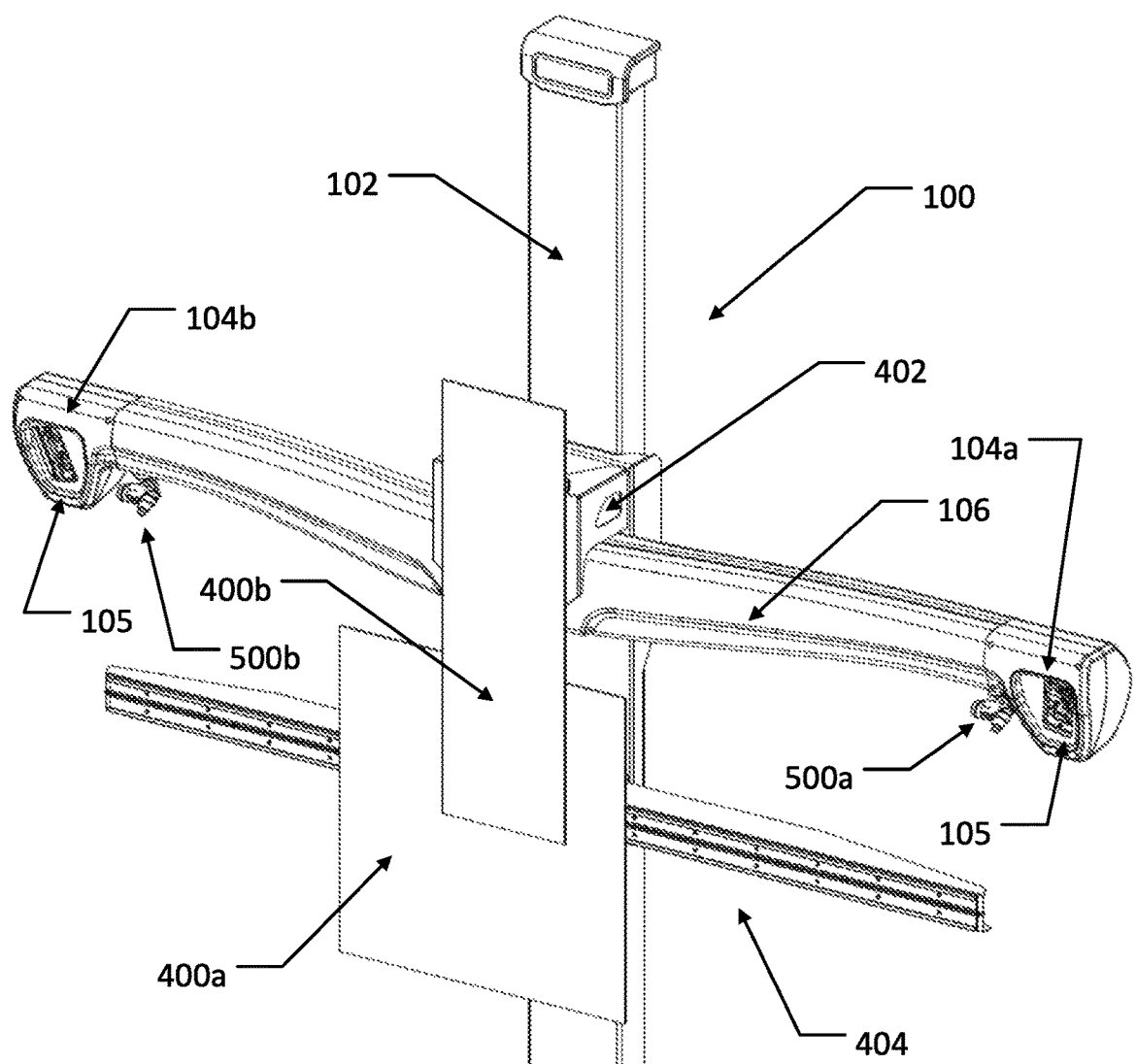
FIG. 1 is a perspective view of a prior art vehicle inspection system with a cross member for supporting optical cameras and multi-axis gimbal optical projectors.
Figure 2:
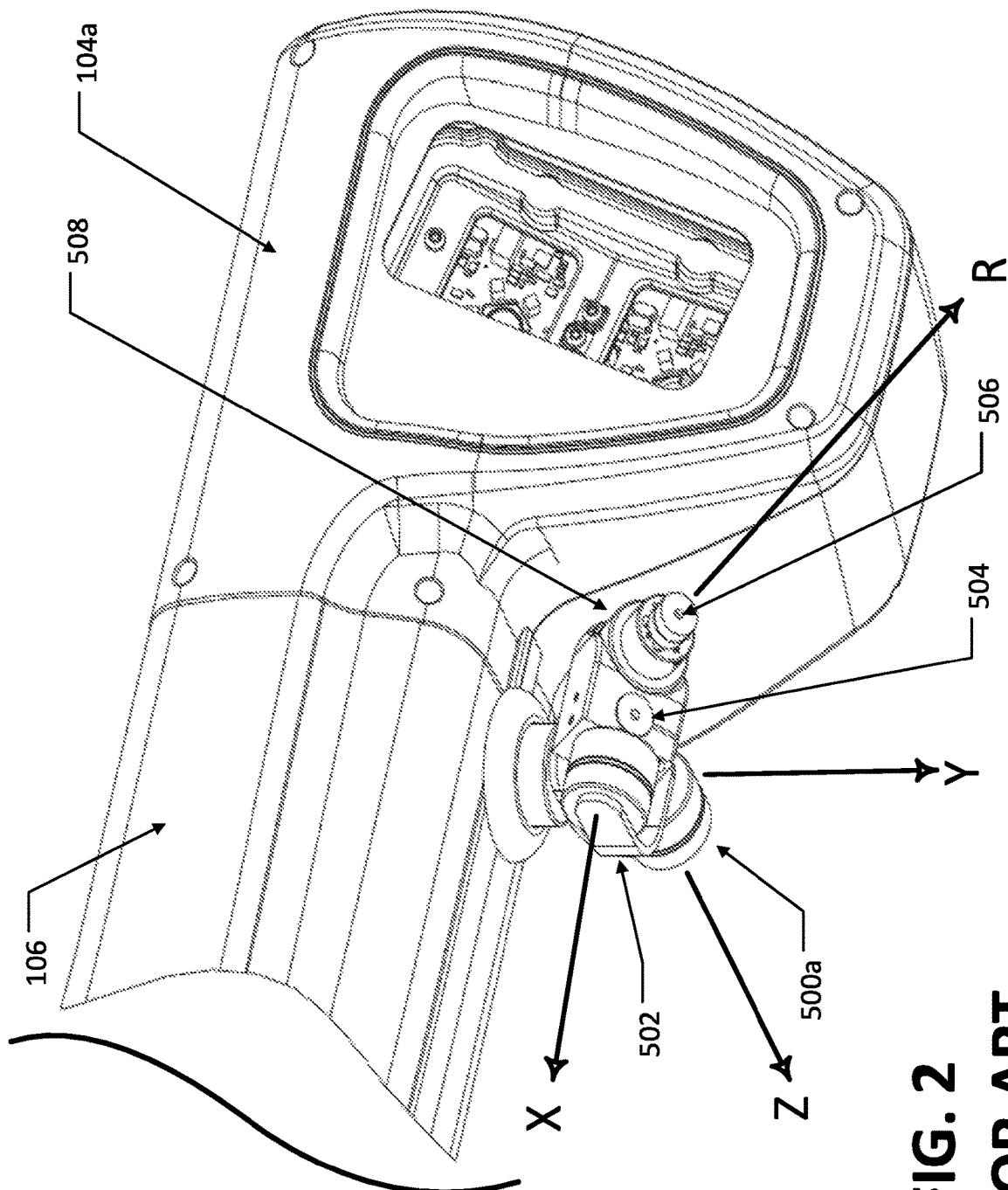
FIG. 2 illustrates an optical camera system and multi-axis gimbal optical projector supported by the cross member on the vehicle inspection system of FIG. 1.

Turning to FIGS. 1 and 2, a prior art vehicle service or inspection system 100 is shown configured with a vertical column 102 mounted on a base 108. The vertical column 102 supports a set of laterally spaced camera modules 104a, 104b and multi-axis gimbal optical projectors 500a, 500b on a camera support beam 106. The vehicle inspection system 100 as shown includes an optional specialized target structure 400a and target support 400b utilized to facilitate a process for realigning or recalibrating one or more safety system sensors onboard a vehicle undergoing a service procedure.

Each camera modules 104 contains one or more cameras 105 with fields of view in a generally forward direction to view each lateral side of a vehicle undergoing service within a vehicle service area in front of the vehicle inspection system 100. The camera support beam 106 is optionally vertically (and/or rotationally) adjustable relative to the vertical column 102 to permit field-of-view adjustments to accommodate elevation changes which may occur when the vehicle is located on an adjustable lift rack (not shown) within the vehicle service area.

It will be recognized that while the embodiments of the vehicle measurement system instrumentation structure illustrated in the Figures and described above utilize a vertical column 102 and a camera support beam 106, other configurations may be utilized without departing from the scope of the present invention. For example, in place of the vertical column 102 and camera support beam 106, articulated camera support arms may be employed to position individual cameras and multi-axis gimbal projectors 500a, 500b in spaced arrangements as required to achieve the fields of view necessary to observe and/or illuminate features or targets associated with a vehicle undergoing service or inspection.

The camera modules 104a, 104b are operatively coupled to a processing system (not shown), which may be disposed in a console in proximity to the vehicle inspection system 100. The processing system is preferably configured with suitable logic circuit components and software instructions for receiving image data from the camera modules 104a, 104b, controlling the multi-axis gimbaled optical projectors 500a, 500b, and for evaluating the received image data. The processing system evaluates the received image data to identify relative spatial positions of observed surfaces, determining spatial relationships, and identify characteristics of an observed vehicle. The configuration of the processing system and camera modules 104a, 104b are generally known in the art of machine vision vehicle wheel alignment systems, and may vary from the specific configuration described herein without departing from the scope of the invention, provided the processing system is capable of determining at least a spatial position of one or more surfaces relative to the observing camera modules 104a, 104b.

To facilitate positioning of the vehicle inspection system 100 generally on a centerline CL of a vehicle undergoing service or inspection, and to enable the set of camera modules 104a, 104b to view features on each lateral side of the vehicle 10, the base structure 108 may include a set of rolling elements, such as casters or wheels 109. During use, the vehicle inspection system 100 is manually moved into a position at a selected distance from the front of the vehicle 10. Different vehicles may require the vehicle inspection system 100 to be positioned at different relative locations, depending upon manufacturer service or inspection guidelines. An optional locking mechanism may be provided on at least one of the rolling elements 109, to prevent accidental movement of the vehicle inspection system 100 during use.

In one embodiment, precise position of the vehicle inspection system 100 is carried out under the guidance of the processing system, in response to an evaluation of the image data acquired from the camera modules 104a, 104b. For example, with the vehicle inspection system 100 positioned generally on the centerline CL of a vehicle undergoing service or inspection, the camera modules 104a, 104b acquire images associated with the front and rear wheels 12 on each lateral side of the vehicle, from which the processing system identifies the position of the vertical column 102 relative to either a geometric centerline CL or a thrust line TL of the vehicle. If adjustments to the position of the vehicle inspection system 100 relative to either the vehicle's geometric centerline CL or thrust line TL are required, suitable guidance can be provided to the operator by the processing system based on the determined relative position of the vehicle inspection system 100.

Figure 3:
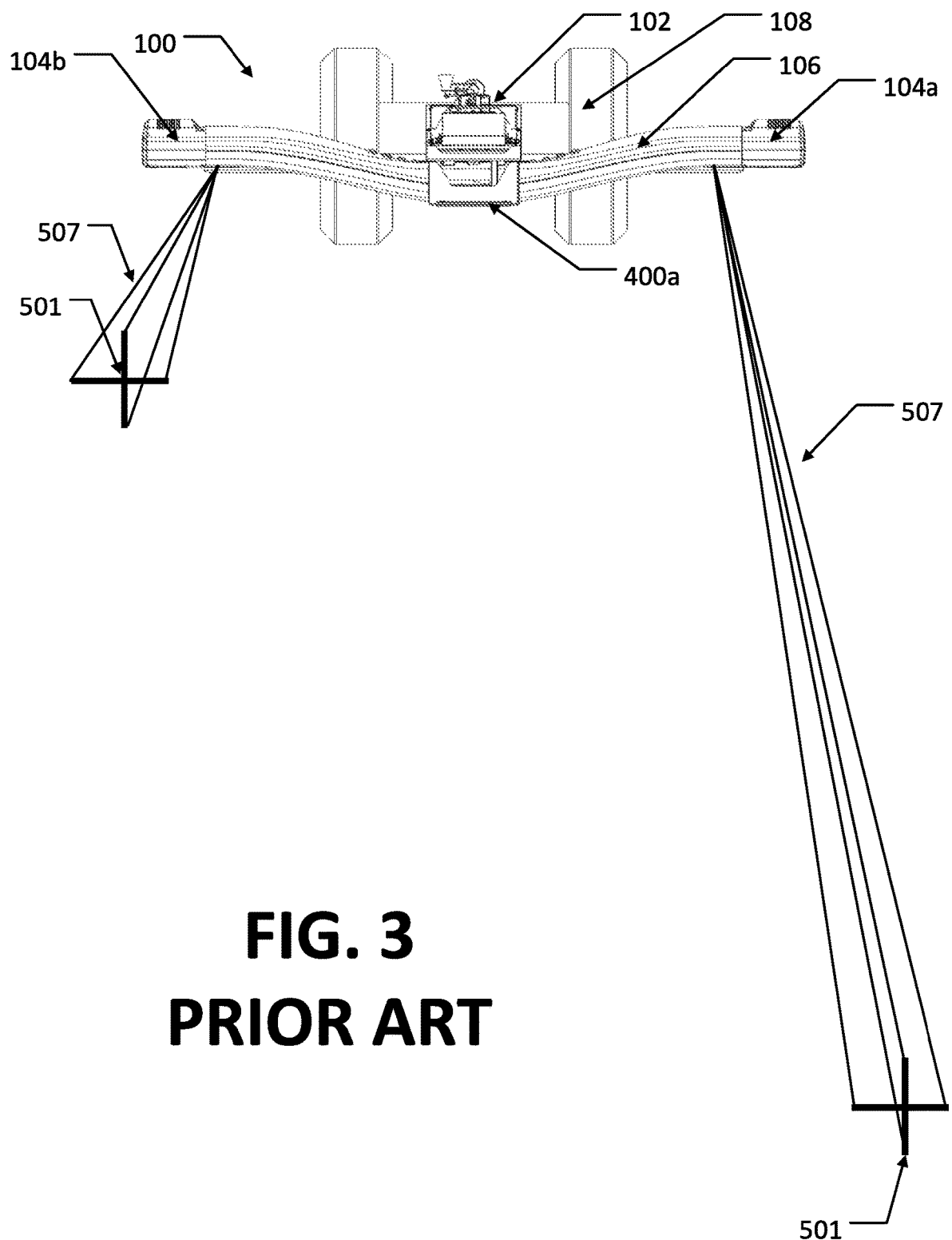
FIG. 3 is a top plan view of the prior art vehicle inspection system of FIG. 1, illustrating visible indicia projected onto a floor surface of a vehicle service bay by the multi-axis gimbal optical projectors.

Turning to FIGS. 2 and 3, the optical projectors 500a, 500b may be disposed on the same structure of the vehicle inspection system 100 carrying the camera modules 104a, 104b, or on another fixture associated with the vehicle inspection system 100. Each optical projector 500a, 500b comprises at least one laser emitter 504, and is configured for controlled movement to orient the laser emitter 504 in order to project visible indicia 501 onto surfaces in proximity to the vehicle inspection system 100. When projecting visible indicia to form a point of illumination on a surface, the movement of the optical projector is controlled to orient a projection axis for the laser emitter 504 (or other light source). For some embodiments, the visible indicia is projected to form a line on a surface, in which case the movement of the optical projector is controlled to orient a projection plane for the laser emitter 504 (or other light source). As seen in FIG. 3, disposing the optical projectors 500a, 500b in a laterally spaced arrangement on the camera support beam 106, in proximity to the camera modules 104a and 104b, enables projection of visible indicia onto surfaces within the fields of view of the camera modules 104a, 104b, as well as onto surfaces located outside the camera modules fields of view, such as forward of, behind, or adjacent to, the vehicle inspection system 100. Exemplary surfaces onto which visible indicia may be projected include the vehicle body, wheel-mounted targets, floor surfaces, and movable targets.

In one configuration of the present disclosure, each optical projector 500a, 500b is mounted on a set 502 of motorized multi-axis gimbals 503a, 503b, and 503c for controlled rotational movement about orthogonal axes (X, Y, and/or Z). Vertical height of the optical projectors 500a, 500b above a supporting floor surface on which the vehicle inspection system 100 is disposed may be adjustable by altering the height of the supporting structure on which the optical projectors are mounted. Within each optical projector 500a, 500b, a second laser emitter 506 may be included on an additional gimbal 508 for rotation about axis R to provide for parallax correction of projected visible indicia 501. Optionally, each optical projector 500a, 500b may further include a laser range finder (not shown) to provide a range-to-target measurement along an axis parallel to the projection axis of the laser emitter 504.

The laser emitters 504 and 506 each transmit beams 507 of light, which may be visible light, infrared light, or UV light, through associated optical focusing elements to project the indicia 501 in the form of spots or lines, onto the illuminated surfaces. The spectrum of light is selected in accordance with the intended manner of viewing the indicia. Visible light is preferred for observation by a human operator, while filtered light, infrared light, or UV light may be preferred for viewing by optical sensors without distraction to a human operator. It will be recognized that the optical projectors 500 may utilized other sources of light, such as LED elements, and associated optical focusing elements in place of the laser emitters 504, 506 to project indicia 501, such as spots or points, lines, or visible illumination of different colors, onto the surfaces without departing from the scope of the present disclosure. Furthermore, the specific number of axes X, Y, Z, R, and vertical elevation about which the optical projectors 500 are configured for movement may vary based on the intended use of the projected indicia 501.

During a vehicle wheel alignment service, measurement, or inspection procedure, the processing system controls the set 502 of multi-axis gimbal mounting structures to orient each laser emitter 504 to project the observable indicia 501 towards a selected location on a surface in proximity to the fixture or support structure 100. The observable indicia 501 may indicate a stationary point or location to aid in the placement of a vehicle service fixture, or may provide lines or boundaries against which optical targets or other vehicle service device may be aligned. The selected locations for the observable indicia 501 are determined by the processing system in response to relative spatial measurements associated with: (1) the vehicle; (2) features of the service bay identified within images captured by the camera modules 104; or (3) features of the vehicle inspection system 100, such as an axis of the support column 102. For example, some vehicle safety system sensor calibration procedures require placement of target structures, observable by onboard vehicle safety system sensors, at select locations relative to the vehicle undergoing inspection or service. Specific placement requirements associated with the safety system calibration procedures for a variety of vehicle makes and models are stored in a database accessible to the processing system. After establishing the relative spatial positions of the vehicle and vehicle inspection system 100 within a common coordinate system or frame of reference, the processing system recalls spatial placement requirements in the same coordinate system or frame of reference for visible targets or calibrations fixtures associated with the vehicle from the accessible database. Utilizing the recalled placement requirements, the processing system directs the orientation of the projection axis of each optical projector 500a, 500b to project indicia 501 at the appropriate locations within the vehicle service area, enabling an operator to carry out or complete a vehicle service, calibration, or inspection procedure.

In order to ensure that the operation of the set 502 of motorized gimbal mounting structures in each optical projector 500a, 500b aligns the observable indicia 501 with the intended spatial location, it is necessary to calibrate the movement of the optical projectors (i.e., orientation of the associated projection axes or projection planes) in response to commands from the processing system. Proper calibration ensures that the commanded movements align the projection axis or projection plane to the desired orientation for projection of indicia 501.

A calibration procedure determines the relationship between an optical projector projection axis or projection plane (i.e., where the laser is pointing), the fields of view of the observing camera modules 104a, 104b, and the spatial environment of the vehicle service area. Calibration is accomplished by mathematically transforming spatial coordinates between coordinate systems associated with the optical projector, observing cameras, and vehicle service area. The transforms between relative coordinate systems define mathematical relationships between the various coordinate systems, and can be represented by translation and rotation components in the form of a six degree-of-freedom (6-DOF) transformation consisting of three translation components and three rotation components. The direction an optical projector's laser is pointing is established by the rotating components of the mounting gimbal coordinate system, where yaw is rotation about the x-axis, pitch is rotation about the y-axis, and roll is rotation about the z-axis. The goal of calibration is to determine the relationships between the various coordinate systems or frames of reference, enabling the laser or other visible indicia, to be pointed to a coordinate location (or along a line segment) specified in the vehicle service area or relative to a vehicle's thrust line.

In order to calibrate the projection axis or projection plane for each optical projector 500a, 500b, at least three indicia points defined in a known spatial relationship to each other are required. Additional indicia points may be utilized to improve the accuracy of the calibration. Preferably, the selected indicia points are disposed across the operational range of the optical projectors. The relationship between the indicia points is defined by known or determined coordinates within a common frame of reference.

Indicia point coordinates are known or measured within one of the vehicle service system coordinate frames of reference, such as a camera module reference frame, a vehicle service bay floor reference frame, or a vehicle support structure runway reference frame. Next, a determination is made of corresponding gimbal yaw, pitch and roll orientations within an optical projector's frame of reference which are required to orient the projection axis for the laser to each of these known indicia points individually, or to orient the projection plane for the laser to two or more of these known indicia points simultaneously. Using the indicia point coordinates, and the corresponding gimbal axes orientations within the same frame of reference, an optimization such as a Levenberg-Marquardt error reducing optimization or a least squares curve fitting algorithm, is employed to determine the relationship (the 6-DOF transform) between the chosen frame of reference and the reference frame of optical projector. The optimization can also compensate for measurement errors associated with the indicia points and pointing errors with the alignment of the optical projector's axis of projection or plane of projection.

In one alternate configuration, the 6-DOF transform is established from over-determined direct methods of relating the gimbal axes orientations and known indicia points instead of performing an optimization calculation. Machine learning techniques, such as neural network approaches may be utilized as well to establish transforms between the optical projector reference frame and the chosen reference frame, without departing from the scope of the present invention.

The various calibration procedure embodiments described in the present disclosure enable the optical projector 500a, 500b to project indicia 501 to a selected point located either forward or rearward of the vehicle service or inspection system 100. However, the cameras modules 104a, 104b of a vehicle service or inspection system 100 typically face forward in a fixed configuration, and generally cannot observe indicia points located rearward of their field of view. Initial embodiments of the present disclosure utilize two calibration fixtures 600a, 600b generally consisting of a transverse structure 602 supporting optical targets 604 at opposite ends for viewing by the camera modules, such as shown in U.S. Pat. No. 9,528,822 to Stieff, which is herein incorporated by reference. At least one of the calibration fixtures 600a, 600b further includes two or more indicia points visible on surfaces of the fixture. The relationship between the indicia points on the fixture surfaces and the visible targets 604 are either mechanically known or measured prior to a start of the calibration procedure.

In a first procedure, the two calibration fixtures 600a, 600b are initially aligned precisely with one another, such that the relationship of the indicia points on the calibration fixture 600a are known relative to the targets 604 on the other calibration fixture 600b. Using the known relationship between the targets and the indicia points, the relative location of the indicia points are measured when the vehicle service or inspection system 100 is reversed to face the second calibration fixture 600b and the optical projectors are re-oriented to project indicia rearward onto the original indicia points on the first calibration fixture 600a.

There are a number of ways to fulfill the fundamental requirements stated above. Intermediate frames of reference may be employed to aid in measurement of the indicia points, such as by employing stationary targets. Additional frames of reference may be used by establishing a relationship between the optical projector reference frame and the intermediate reference frame, and then between the intermediate reference frame and a reference frame associated with the vehicle service system. For example, a mechanical fixture providing a plurality of indicia points may be mounted to the vehicle service system 100. The optical projector is oriented to point to those points, and a transform is determined between the optical projector projection axis and the mechanical fixture. The mounting of the mechanical fixture could is known or calibrated relative to the vehicle service system and establishes an intermediate reference frame in this sense.

A method of the present disclosure for calibrating movement of an optical projector 500a, 500b of a vehicle inspection system 100 facilitates an alignment of projected visible indicia 507 with selected spatial locations in proximity to the vehicle inspection system 100. Initially, a spatial relationship is determined between the optical projector 500a, 500b and a plurality of reference targets located within a first operative field of view of the optical projector 500a, 500b. For each reference target location, an orientation of the optical projector 500a, 500b, as defined by the individual rotational orientations about each axis of a multi-axis gimbal on which the optical projector is mounted, required to align the indicia projected by the optical projector is determined and stored. The determined individual axis orientations associated with each reference target location are evaluated collectively to establish an error-minimizing six-degree-of-freedom (6-DOF) transform between the optical projector 500a, 500b and the spatial location of each reference target. The resulting 6-DOF transform is subsequently utilized to determine additional orientations required for the optical projector to direct projected indicia 507 onto any identified spatial location in proximity to the vehicle inspection system 100.

Figure 4:
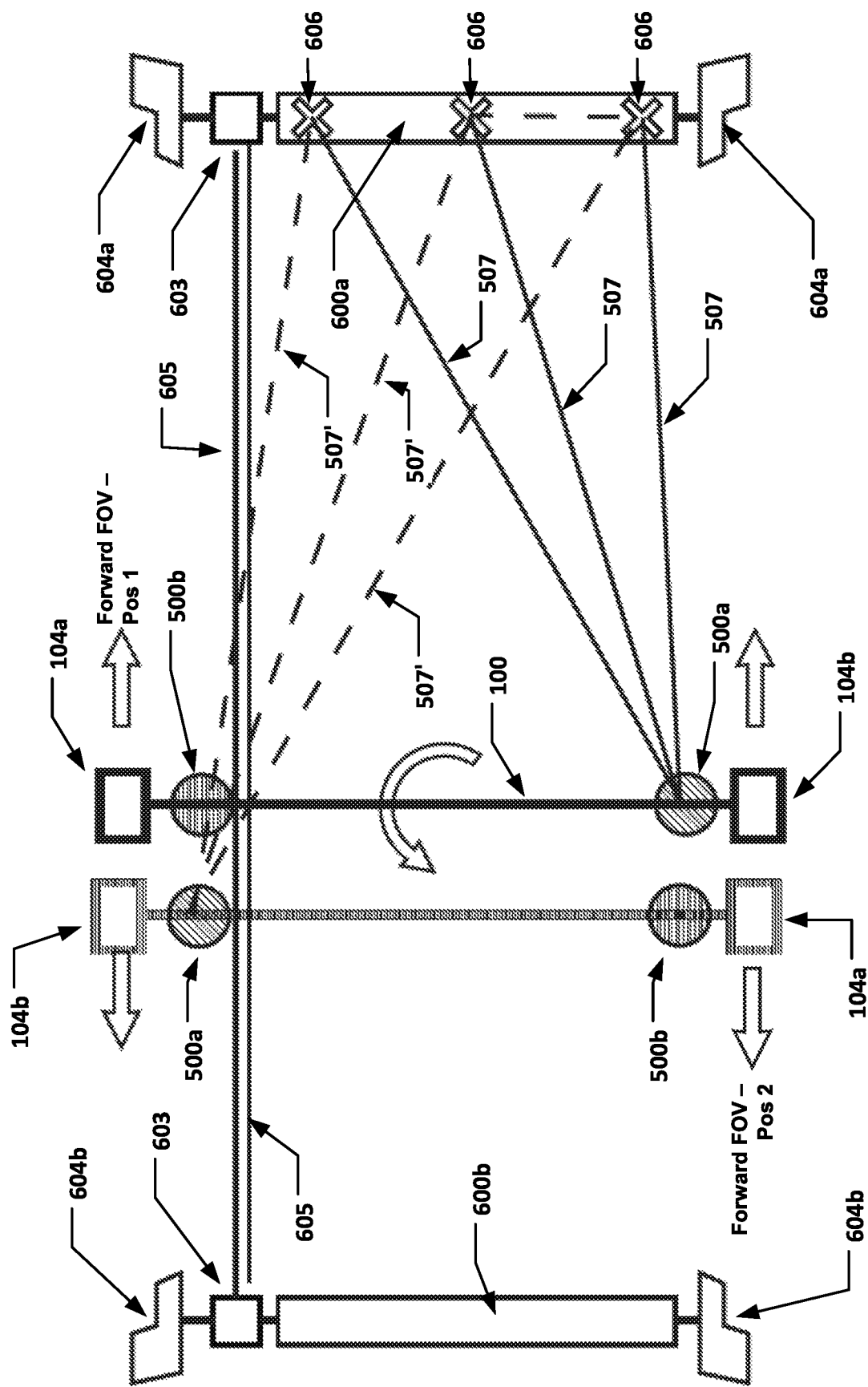
FIG. 4 is a diagrammatic representation of relative placement locations for calibration fixtures and a vehicle inspection system during calibration of the multi-axis gimbal optical projectors according to a method of the present disclosure.

Turning to FIG. 4, an implementation of a first method of the present disclosure for calibrating components of the vehicle inspection system 100 is illustrated for use in an vehicle service bay. Initially, a first calibration fixture 600a and a second calibration fixture 600b are placed in a determinable, spaced apart and aligned relationship within the vehicle service bay in proximity to the vehicle inspection system 100. The first calibration fixture 600a is placed within a forward-looking field of view of the optical cameras 104a, 104b of the vehicle inspection system 100 located in a first position. The second calibration fixture 600b is placed in longitudinal alignment with the front calibration fixture 600a, outside of the field of view of the optical cameras 104a, 104b, such as behind the vehicle inspection system 100 (first position). Various methods for ensuring that the first and second calibration fixtures 600a, 600b are in longitudinal alignment within the service bay may be utilized without departing from the scope of the present disclosure. For example, cooperative laser projectors and retro-reflectors 603 mounted to the calibration fixtures, project and reflect laser beams 605 orthogonal a rotational axis of the calibration fixtures. By aligning retro-reflected laser beams 605, the fixtures may be positioned in longitudinal alignment. Alternatively, the calibration fixtures 600a, 600b may be positioned at previously determined calibration locations within the vehicle service bay.

With the calibration fixtures 600a, 600b positioned in the determinable aligned relationship with each other, the optical cameras 104a, 104b are operated to acquire images of the optical targets 604a associated with the first calibration fixture 600a. The acquired images are conveyed to the processing system for evaluation utilizing conventional image processing and spatial calibration algorithms to determine a spatial relationship between the vehicle inspection system 100 in the first position and the first calibration fixture 600a. If inclinometers are present on the calibration fixtures and the vehicle inspection system, the direction of gravity may be utilized to establish a common coordinate system for referencing components of the vehicle inspection system and the calibration fixtures. Next, the processing system directs operation of the optical projectors 500a, 500b to project visible indicia individually onto a plurality of known reference points 606 located on the first calibration fixture 600a, as shown in FIG. 4 for optical projector 500a only. Each optical projector 500a, 500b is separately directed to rotate about the individual axes of the associated multi-axis gimbals in order to achieve orientations calculated to align the projection axes 507 with the determined relative spatial positions of the selected reference points 606. Following the directed orientation rotations, observed misalignment between the projected indicia and the selected reference points 606 is visually identified, providing the processing system with feedback required to incrementally adjust the calculated axes orientations for each optical projector 500a, 500b to achieve alignment between the projected indicia and the selected reference points 606 to within acceptable tolerances. Once aligned, the resulting axes orientations required for each optical projector 500a, 500b to align the projected indicia with the plurality of selected reference points 606 are utilized to establish an optimized six-degree of freedom (6-DOF) transformation or calibration between spatial locations in proximity to the vehicle inspection system 100 and corresponding optical projector axes orientations.

If the data acquired from the observation of the selected reference points 606 on the first calibration fixture 600*a* is sufficient to achieve a desired level of accuracy for the transformation or calibration, the process may be considered complete with the need to utilize the second calibration fixture 600*b*. If a greater level of accuracy of the 6-DOF transformation or calibration is required, the accuracy may be improved by increasing the number of selected reference points 606 and/or the size of the spatial region within which they are located.

For example, in one embodiment of the present method, the optical projectors 500*a*, 500*b* are utilized to project indicia within a rearward-looking portion of their field of view, as well as the forward-looking portion. To establish axes orientations required for the optical projectors to accurately project indicia in a rearward direction, the vehicle inspection system 100 is rotated approximately 180 degrees about a vertical axis, and repositioned between the first and second calibration fixtures 600*a*, 600*b* to a second position as shown at Pos. 2 in FIG. 4 such that the second calibration fixture 600*b*, previously placed behind the vehicle inspection system 100, is within the forward field of view of the optical cameras 104*a*, 104*b*. The optical cameras 104*a*, 104*b* are operated to acquire images of optical targets 604*b* mounted to the second calibration fixture 600*b*. The acquired images are conveyed to, and evaluated at, the processing system utilizing conventional image processing and spatial calibration algorithms to determine a relative spatial relationship between the vehicle inspection system 100 in the second position and the calibration fixture 600*b*. Following a determination of the spatial relationship between the vehicle inspection system 100 and the calibration fixture 600*b*, a spatial location of the first calibration fixture 600*a* relative to the repositioned vehicle inspection system 100 is known from the previously determined spatial relationship between the calibration fixtures 600*a*, 600*b*. Using the known spatial relationships, the processing system separately directs each optical projector 500*a*, 500*b* to orient the associated projection axes 507' to project indicia onto the plurality of selected reference points 606 on the calibration fixture 600*a*, which is now located behind the vehicle inspection system 100.

Following the directed movement, observed misalignment between the projected indicia from a selected optical projector 500*a*, 500*b* (such as 500*a* shown in FIG. 4) and the reference points 606 is identified, providing the processing system with feedback required to incrementally adjust the calculated orientation axes of each optical projector 500*a*, 500*b* to achieve alignment between the projected indicia and the reference points 606 in the rearward field of view to within acceptable tolerances. Once aligned, the resulting orientations required for each optical projector 500*a*, 500*b* are utilized to refine the optimized six-degree of freedom (6-DOF) transformation or calibration between spatial locations in proximity to the vehicle inspection system 100, and the corresponding axes orientations required to align associated optical projectors 500*a*, 500*b* for projection of visible indicia 501 at spatial locations with a full-range operating field of view.

Figure 5:
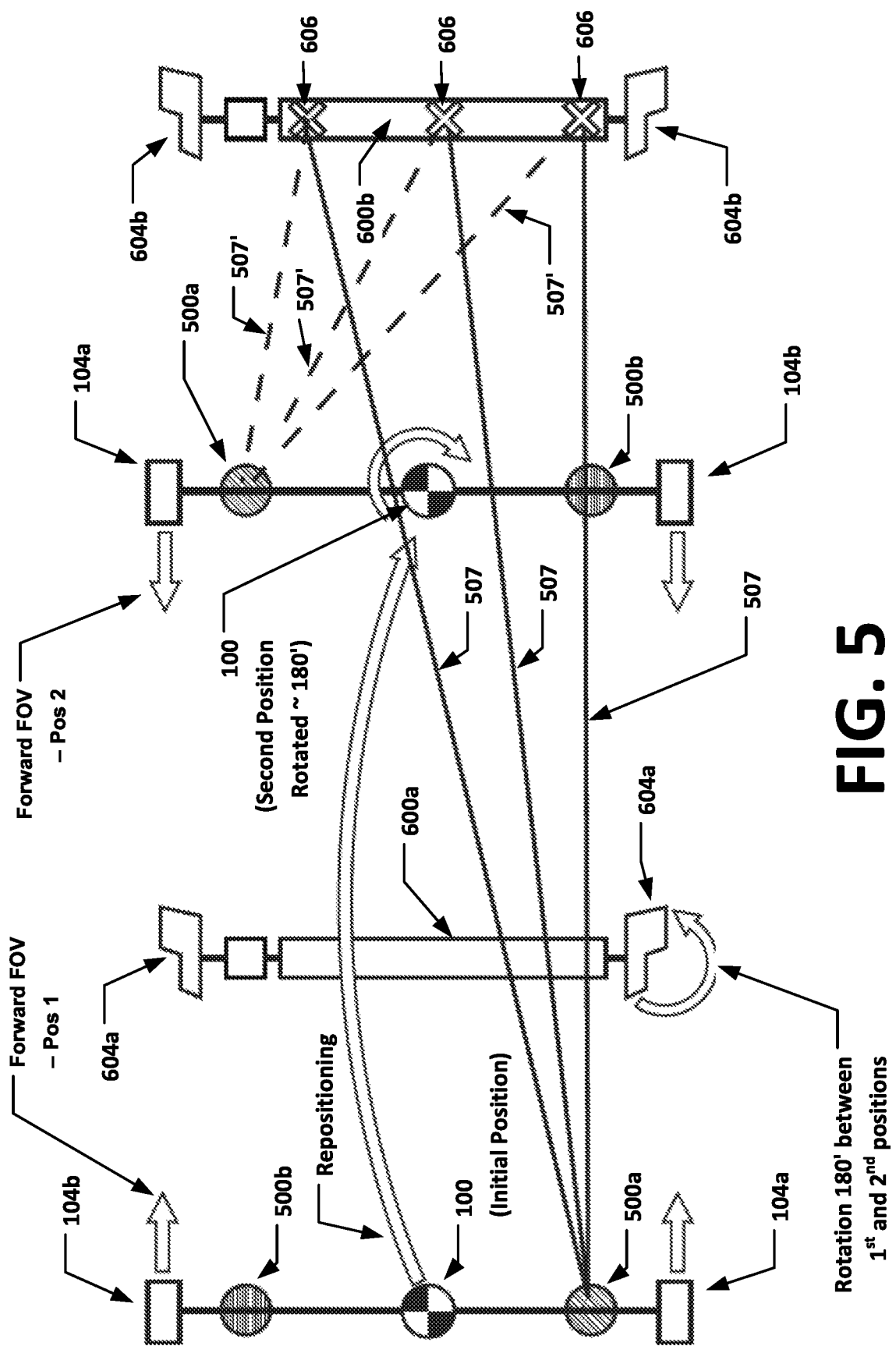
FIG. 5 is a diagrammatic representation of relative placement locations for calibration fixtures and a vehicle inspection system during calibration of the multi-axis gimbal optical projectors according to an alternate method of the present disclosure.

Those of ordinary skill in the art will recognize that this method of the present disclosure may be readily utilized to calibrate the optical projectors to project indicia over any region of an operating field of view so long as the camera modules 104*a*, 104*b* of the vehicle inspection system are able to acquire images of at least one calibration fixture which is in a known (or determined) relationship to an established reference, such as another calibration fixture, within optical projector operating field of view. Turning to FIG. 5, an alternate method for calibrating components of the vehicle inspection system 100, and in particular, for calibrating controlled orientation of the optical projectors 500*a*, 500*b* to align associated projected indicia 501 with selected spatial locations to within acceptable tolerances is illustrated. Initially, a first calibration fixture 600*a* and a second calibration fixture 600*b* are placed in a vehicle service bay in a determinable spaced apart relationship within a forward-looking field of view of the optical cameras 104*a*, 104*b*. Preferably, the calibration fixtures 600*a*, 600*b* are placed in a region where a vehicle undergoing service or inspection will be located within the vehicle service bay when facing the vehicle inspection system 100.

With the calibration fixtures 600*a*, 600*b* positioned in the determinable relationship with each other, the optical cameras 104*a*, 104*b* acquire images of optical targets 604*a* mounted on calibration fixture 600*a*, and optical targets 604*b* mounted on calibration fixture 600*b*. The acquired images are conveyed to, and evaluated at, the processing system utilizing conventional image processing and spatial calibration algorithms to determine a spatial relationship between the vehicle inspection system 100 and each calibration fixture 600*a*, 600*b*, within a common frame of reference or coordinate system. Identifying the spatial relationship between each calibration fixture 600*a*, 600*b* and the vehicle inspection system 100 further identifies a direct spatial relationship between the individual calibration fixtures 600*a* and 600*b*.

Following the determination of the spatial relationships between each of the vehicle inspection system 100 and the calibration fixtures 600*a*, 600*b*, the processing system directs axes orientation of each optical projector 500*a*, 500*b* to project indicia onto a plurality of reference points 606 located on the second calibration fixture 600*b* by calculating orientations of projection axes 507 for each optical projector 500*a*, 500*b* required to align the projected indicia with each selected reference point. FIG. 5 illustrates the projection axes 507 associated with a single optical projector 500*a*. Misalignment between the projected indicia and each selected reference point 606 is identified, providing the processing system with feedback required to incrementally adjust the associated axes orientations of each optical projector 500*a*, 500*b* as necessary to achieve alignment to within acceptable tolerances. Once aligned, the resulting axes orientations required for each optical projector 500*a*, 500*b* to align the projected indicia with the plurality of selected reference points 606 are utilized to establish an optimized six-degree of freedom (6-DOF) transformation or calibration between selected spatial locations in proximity to the vehicle inspection system 100 and the axes orientations required for each optical projector 500*a*, 500*b* to project visible indicia at the selected spatial locations.

To improve the accuracy of the 6-DOF transformation or calibration, the number of selected reference points and the size of the spatial region within which they are located is increased. For example, in a further embodiment of the present method, illustrated in FIG. 5, the optical projectors 500*a*, 500*b* are utilized to project indicia within a rearward-looking portion of their field of view as well as a forward-looking portion. To establish axes orientations of the optical projectors required to accurately project indicia 501 in a rearward direction, the vehicle inspection system 100 is repositioned following an initial determination of a 6-DOF transformation or calibration to a location which is located between the first and second calibration fixtures 600a, 600b. The vehicle inspection system 100 is rotated approximately 180 degrees about a vertical axis, such that the first calibration fixture 600a is within the forward-looking field of view of the optical cameras 104a, 104b, while the second calibration fixture 600b is located behind the vehicle inspection system 100, outside of the field of view of the optical cameras. The optical targets 604a on the first calibration fixture 600a are rotated approximately 180 degrees within their associated target mountings, without altering the position of the first calibration fixture 600a, such that the optical targets 604a are visible to the optical cameras 104a, 104b. Images of the rotated optical targets 604a are acquired by the optical cameras 104a, 104b, and are conveyed to the processing system for evaluation utilizing conventional image processing and spatial calibration algorithms. The evaluation process determines a spatial relationship between the repositioned vehicle inspection system 100 and the first calibration fixture 600a. Using the newly determined spatial relationship, the processing system further determines a spatial relationship between the relocated vehicle inspection system 100 and the second calibration fixture 600b by using the previously established direct spatial relationship between the calibration fixtures 600a, 600b which remains unchanged by the repositioning of the vehicle service system 100.

From the determination of the new spatial relationship between the repositioned vehicle inspection system 100 and the calibration fixtures 600a, 600b, the processing system calculates individual projection axes orientations 507' for each optical projector 500a, 500b required to project indicia onto the plurality of selected reference points 606 now located behind the repositioned vehicle inspection system 100. Misalignment between the projected indicia and the reference points 606 is identified, providing the processing system with feedback required to incrementally adjust the axes orientation of each optical projector 500a, 500b as necessary to achieve alignment between the projected indicia and the reference points 606 to within acceptable tolerances. Once aligned, the resulting axes rotational orientations required for each optical projector 500a, 500b are utilized to refine the optimized 6-DOF transformation or calibration between selected spatial locations in proximity to the vehicle inspection system 100 and the corresponding axes orientations required at each optical projector 500a, 500b for projection of indicia 501 at the selected spatial locations.

While the above-described embodiments are illustrated in the context of an optical projector configured to project a visible indicia as a single point, and hence utilize individual reference targets and the projection axis of the optical projector, it will be understood that the techniques described may be utilized in the context of an optical projector configured to project a laser line by referencing the projection plane and two or more reference targets simultaneously without departing from the scope of the disclosure.

Figure 6:
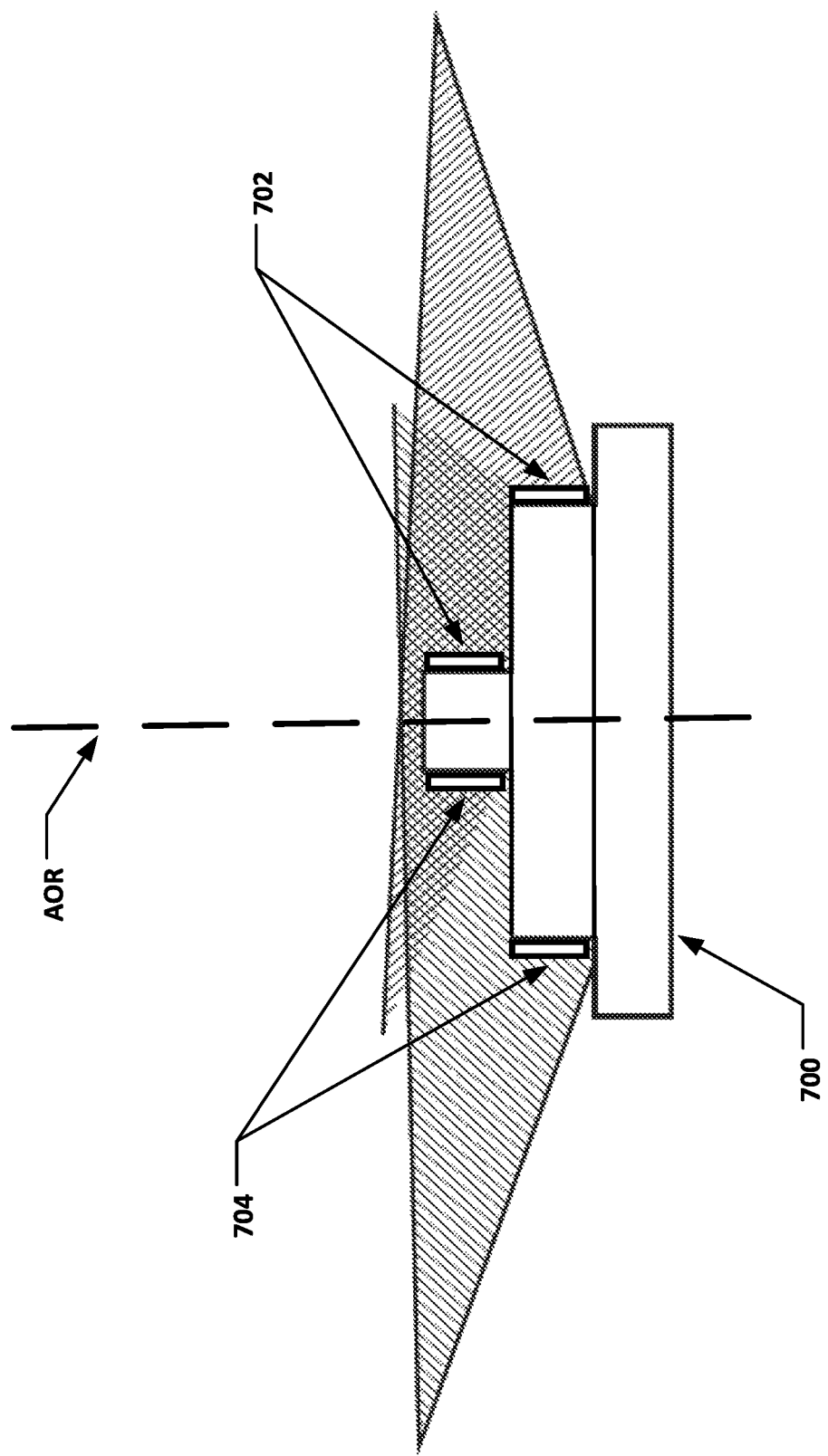
FIG. 6 is a cross-sectional representation of a double-sided optical target for attachment to an outboard end of a calibration fixture to facilitate identification of spatial relationships between the calibration fixture and an observing optical camera system.

As an alternative to rotating the optical targets 604a on the first calibration fixture 600a following a repositioning the vehicle inspection system 100 as shown in FIG. 5, the first calibration fixture 600a may be provided with double-sided or multi-faceted optical targets 700, such as shown in FIG. 6. Optical target 700 is configured to couple to the rotational axis of a calibration fixture 600a in the same manner as a conventional optical target 604a. The optical target 700 includes at least two pairs of target surfaces 702, 704 arranged such that target elements disposed on at least one target surface (or portion of a target surface) are visible from opposite sides of the optical target 700 without the need to alter a rotational orientation of the optical target 700 about the rotational axis of the calibration fixture.

A relationship between the various target surfaces 702 and 704 may be predetermined prior to use, such as by calibration or controlled manufacturing, or may be determined relative to the rotational axis of the calibration fixture 600a by a compensation process. With the relationship between the target surfaces 702, 704 known or determined, spatial measurements of one target surface acquired from a field-of-view from a first direction directly establish spatial measurements to the other target surface. Use of optical targets 700 eliminates the need to alter a rotational position of the optical targets 604a during a calibration of the optical projectors 500a, 500b as described above, reducing measurement errors introduced by unintentional movement of the calibration fixture 600a or runout about the target rotational axis. Those of ordinary skill in the art will recognize that the specific configuration of the optical target 700 may vary from that shown and described herein, so long as the target 700 provides multiple surfaces or regions having optically visible target elements, in known or determinable relationships, which are visible to observing cameras positioned on generally opposite sides of the optical target 700 when it is secured on the rotational axis (AOR) of a calibration fixture. For example, target surfaces 702 and 704 may be defined by continuous annular surfaces which are concentrically disposed, such as in a tiered configuration.

In a simplified method of the present disclosure, a single calibration fixture 600a is placed within the vehicle service bay in proximity to the vehicle inspection system 100, within the forward-looking field of view of the optical cameras 104a, 104b. The optical cameras 104a, 104b are operated to acquire images of the optical targets 604a associated with the calibration fixture 600a, which are conveyed to the processing system for evaluation. Utilizing conventional image processing and spatial calibration algorithms, the processing system is configured to determine a spatial relationship between the vehicle inspection system 100 and the calibration fixture 600a. If inclinometers are present on the calibration fixture and the vehicle inspection system, the direction of gravity may be utilized to establish a common coordinate system for the vehicle inspection system and the calibration fixture. Next, the processing system directs operation of the optical projectors 500a, 500b to project visible indicia individually onto a plurality of known reference points 606 located on the calibration fixture 600a. Each optical projector 500a, 500b is separately directed to rotate about the individual axes of the associated multi-axis gimbals in order to achieve orientations calculated to align the projection axes 507 with the determined relative spatial positions of the selected reference points 606. Following the directed orientation rotations, observed misalignment between the projected indicia and the selected reference points 606 is visually identified, providing the processing system with feedback required to either incrementally adjust the calculated axes orientations for each optical projector 500a, 500b, or direct repositioning of the calibration fixture 600a, to achieve alignment between the projected indicia and the selected reference points 606 to within acceptable tolerances. Any incremental adjustments to the calibration fixture position are measured and recorded by the processing system via the optical cameras 104a, 104b observing the spatial position and orientation of the optical targets 604a associated with the first calibration fixture 600a. The resulting axes orientations and reference point spatial positions (as defined by the position of the calibration fixture 600a) are utilized to establish the six-degree of freedom (6-DOF) transformation or calibration between spatial locations in proximity to the vehicle inspection system 100, and optical projector axes orientations required to align projected indicia there with. It will be recognized that while the use of a single calibration fixture 600a alone does not require the optical projectors to operator over a large field of view (as compared to the aforementioned embodiments requiring first and second calibration fixtures), the resulting 6-DOF transform may be sufficiently accurate for calibration purposes.

The use of a 6-DOF transform to convert between a location in three dimensional space, and the aligned orientation of an optical projector's projection axis in a common coordinate system or frame of reference may be replaced by a look-up table. The look-up table sets out known or determined projection axis orientations required to project indicia to selected spatial locations with the common coordinate system or frame of reference. Projection axis orientations associated with spatial locations not listed in the look-up table are interpolated from the closest adjacent spatial locations which are included in the look-up table. The look-up table may be initially populated by utilizing the calibration procedures set forth herein for selectively aligning the projection axis of the optical projector with a plurality of reference targets at known locations within the common coordinate system or spatial frame of reference. New entries to the look-up table may be added over time for increased accuracy in orienting the optical projector projection axis.

Figure 7:
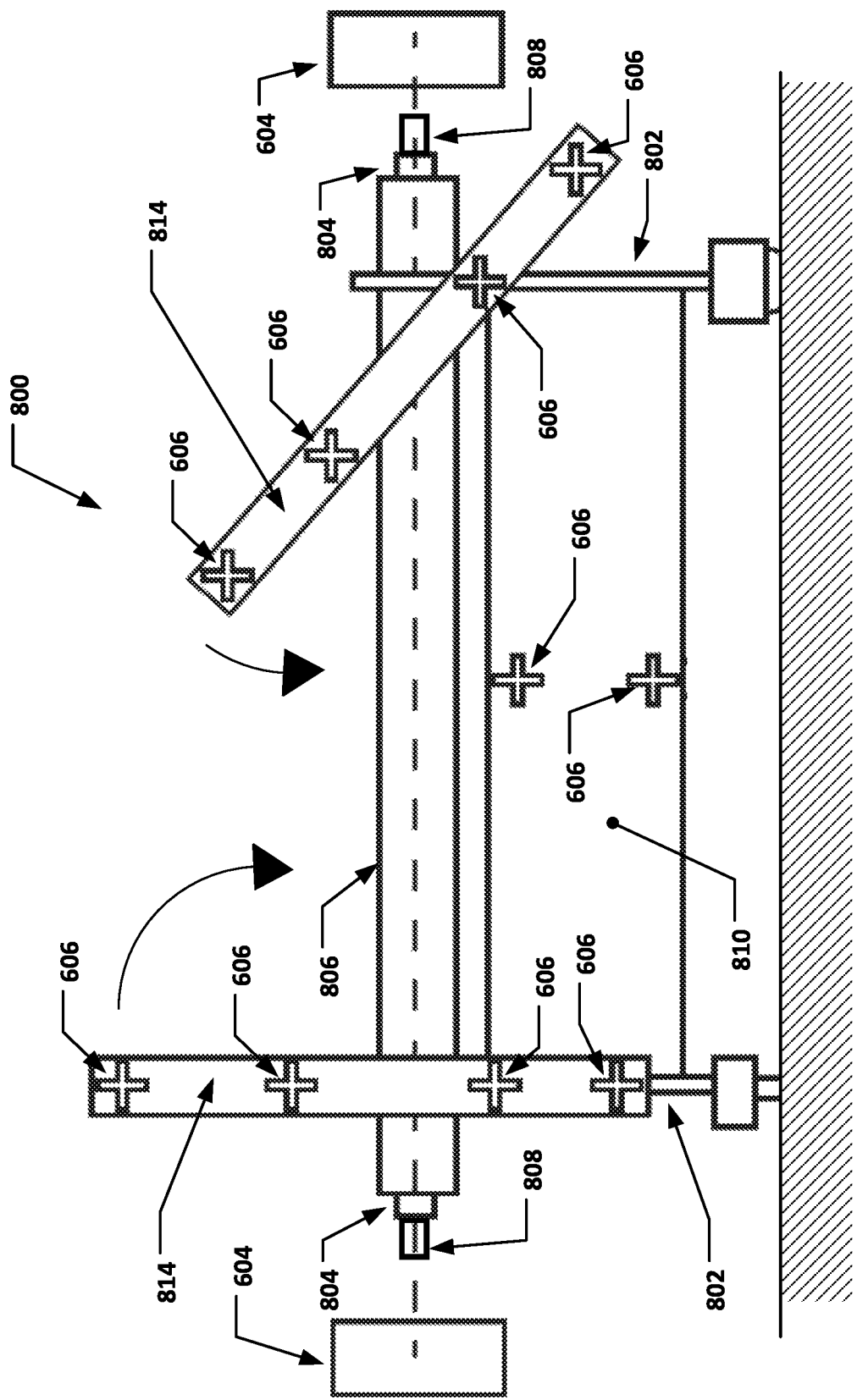
FIG. 7 is a front view of a calibration fixture of the present disclosure for use during calibration of the multi-axis gimbal optical projectors.

In a further embodiment of the present disclosure, a calibration fixture 800 for use in place of the first and second fixtures 600a, 600b during the calibration of the optical projector multi-axis gimbals 500a, 500b on a vehicle inspection system 100 is illustrated in FIG. 7. The calibration fixture 800 consists of a pair of support legs 802, and a transverse bar 804 supported for rotation within an outer support tube 806 supported on the legs 802, such as shown in U.S. Pat. No. 9,528,822 to Stieff, herein incorporated by reference. A hub 808 for receiving an optical target 604a, 604b, 700 is secured to each end of the rotating transverse bar 804, such that optical targets 604a, 604b, 700 mounted to each hub are maintained in alignment with an axis of rotation (AOR) at opposite ends of the transverse bar 805. A target plate 810 extends transversely between the pair of support legs, providing a vertically planar surface on which are disposed a plurality of visible reference points 606. Additional reference points 606 are provided on elongated planar calibration scales 812 pivotally mounted to each support leg, for rotational movement, as indicated by the directional arrows shown in FIG. 7, between a horizontal orientation parallel to the transverse bar, and a vertical orientation extending above the transverse bar 804.

Indicia 501 projected onto a floor surface from an optical projector 500a, 500b define one end of an illumination axis 507 corresponding to a hypotenuse of a right triangle. The vertical height of the optical projector 500a, 500b defines a vertical leg of the triangle, while a linear distance between the optical projector 500a, 500b and the projected indicia 501 on the floor surface define a horizontal leg of the triangle. It will be readily understood a small change in the pitch axis orientation of the optical projector 500a, 500b will result in a proportionally greater change in the linear distance to the projected indicia 501. Attempts to precisely align the projected indicia 501 with reference markings on a floor surface by altering the pitch axis of the optical projector 500a, 500b can be difficult due to this effect.

Positioning the calibration fixture 800 at a known or determined linear position between the vehicle inspection system 100 and a set of reference markings on a floor surface provides an alternative set of reference points 606 against which the optical projectors 500a, 500b may be calibrated. The vertically planar surface of the upright target plate 810 and the planar calibration scales 814 locate reference points 606 at various predetermined vertical heights above the floor surface, positioned to intersect the illumination axis 507 of the optical projector 500a, 500b when the illumination axis 507 is oriented towards the reference markings on the floor surface behind the calibration fixture 800. A small change in the pitch axis of the optical projector 500a, 50b results in a proportional change in the vertical elevation of the indicia 501 projected onto the calibration fixture 800, facilitating corrective adjustments to the optical projector 500a, 500b orientation. By orienting the optical projector 500a, 500b to project indicia 501 onto the reference points 606 on the calibration target 800, as an alternative to reference markings on the horizontal floor surface, the optical projectors 500a, 500b can be calibrated for rotational movement about both the pitch and yaw axes, ensuring that projected indicia 501 subsequently projected towards the horizontal floor surface during a vehicle service procedure will align with intended target positions to within acceptable tolerances.

The aforementioned procedures for calibrating the optical projectors 500a, 500b of a vehicle inspection system 100 require determining relative positions of the vehicle inspection system and various calibration fixtures 600a, 600b within an uncharacterized spatial volume. Alternative calibration procedures for the optical projectors 500a, 500b utilize fixed, known reference points (i.e. monuments) located at known placement locations throughout a calibration spatial volume (such as a vehicle service area) for determined placement of the vehicle inspection system 100 together with a set of reference target objects. For example, with the vehicle inspection system 100 disposed at a pre-defined location within the calibration area, the optical projectors 500a, 500b may be operated by the processor to exercise a range of orientations about each available pitch, yaw, roll axis in order to project indicia 501 onto reference target objects 900 seated on various monuments in proximity to the vehicle inspection system 100. The processor utilizes the known placement locations for both the vehicle inspection system 100 and selected reference target objects 900 (defined by the monuments) to calculate orientations for each optical projector 500a, 500b required to project indicia onto the reference target objects 900. Incremental adjustments to the calculated axes orientations of the optical projectors 500a, 500b required to precisely align the projected indicia 501 with the reference target objects to within an acceptable tolerance are recorded. The recorded rotational axes orientations of the optical projectors 500a, 500b associated with the spatial coordinates of each selected reference target object 900 are utilized to establish an optimized or error-minimization six-degree of freedom (6-DOF) transformation or calibration between selected spatial locations in proximity to the vehicle inspection system 100 and the corresponding axes orientations required at each optical projector 500a, 500b in order to project indicia 501 to the selected spatial locations.

Figure 8:
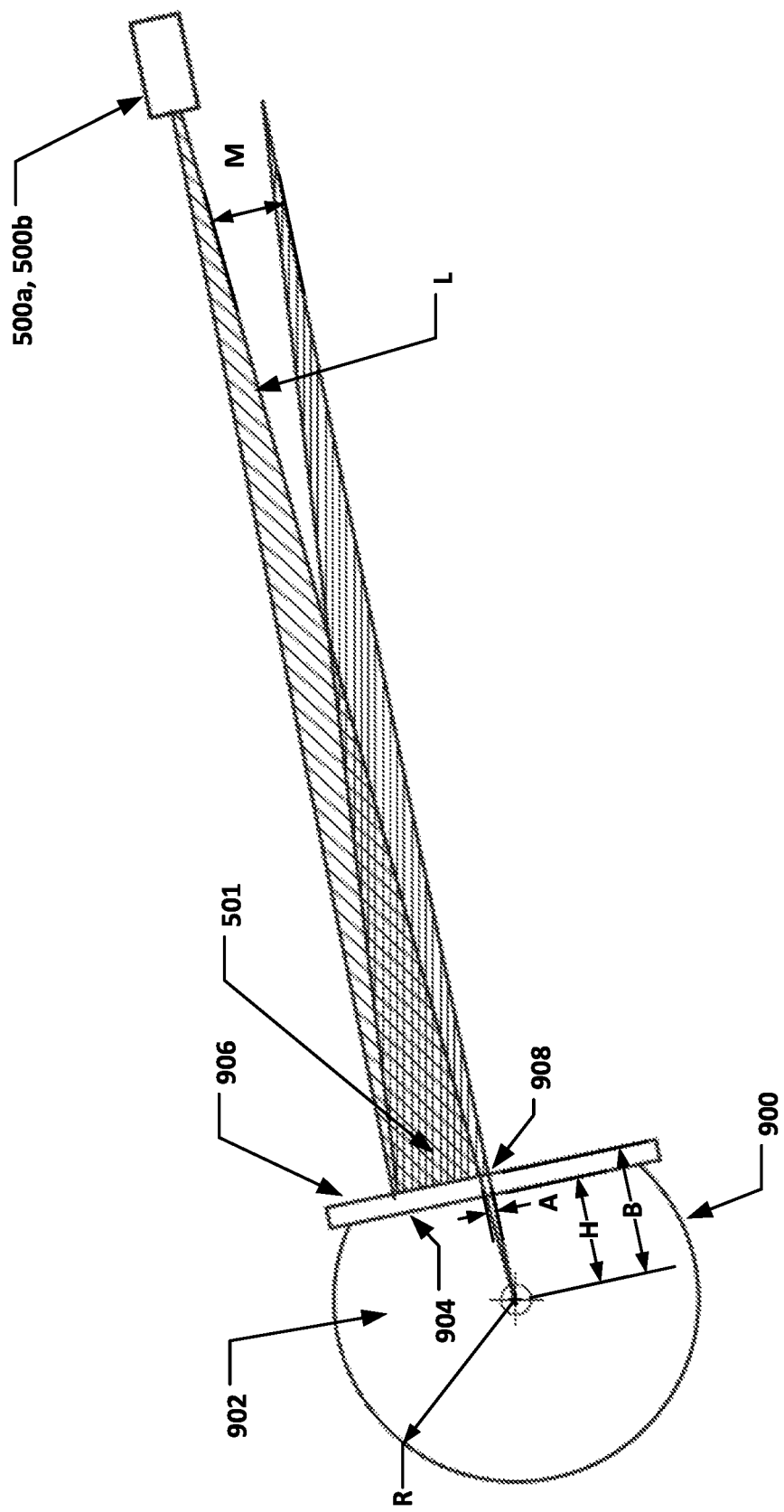
FIG. 8 is a cross-sectional of a target object of the present disclosure for use during calibration of the multi-axis gimbal optical projectors, illustrating various illumination axis and misalignment angles.

Turning to FIG. 8, the present disclosure sets forth a spherical reference target object 900 configured to aid in the calibration of the optical projectors 500a, 500b. The target object 900 consists of a spherical body 902 having a known radius R sized to seat within a fixed monument located within a vehicle service area. A spherical cap, having a radial height H less than the radial dimension R of the spherical body 902, is removed from the spherical body 902 to define a flat plane 904. An optically reflective surface 906 is provided on the flat plane 904, either by polishing the surface or by placement of an optically reflective mirror. A visible reference mark 908 is provided at the center of the flat plane 904. The reflective surface 906 and visible reference mark 908 are configured such that a beam of light L orthogonally intersecting the surface 906 at the visible reference mark 908 is radially aligned with the center C of the spherical body 902, as seen in FIG. 8.

During a calibration procedure for a vehicle inspection system 100, a reference target object 900 is seated on a fixed monument at a known location within the operative field of view for an optical projector 500a, 500b. When seated in the fixed monument, the center C of the reference target object 900 is located at a known location in three-dimensional space, established by the location of the fixed monument and the radial dimension R of the spherical body 902. Next, an optical projector 500a, 500b is oriented by the processing system to align projected indicia, such as a laser line, with the known location for the center C of the reference target object 900. The orientation for the optical projector 500a, 500b is calculated using the known location of the fixed monument relative to the location of the vehicle inspection system 100, and the known dimensions of the reference target object 900. If the projected indicia 501 does not align with the visible reference mark 908 on the reflective surface 906, an orientation of the target object 900 seated on the monument is adjusted manually until the projected visible indicia is reflected back to the source at the optical projector, indicating that the projection axis 501 for the projected indicia 501 is orthogonal to the flat plane 904. Any linear misalignment "A" between the indicia on the reflective surface 906 and the visible reference mark 908 is measured. Utilizing misalignment "A" and a known or measured axial distance "B" between the reflective surface 906 and the optical projector 500a, 500b, an angular misalignment (aiming error) M can be calculated according to:

$$M = \tan^{-1}\left(\frac{A}{B}\right) \qquad \text{Eqn. 1}$$

The calculated angular misalignment M is subsequently utilized to incrementally adjust the orientation of the optical projector 500a, 500b to align the projected indicia 501 with the visible reference mark C. The procedure is repeated by placing the reference target object 900 at various monument locations throughout the operative field of view of each optical projector 500a, 500b, establishing a set of data points which can be utilized to refine a 6-DOF transform between the optical projector orientations and selected locations within the vehicle service area.

Figure 9B:
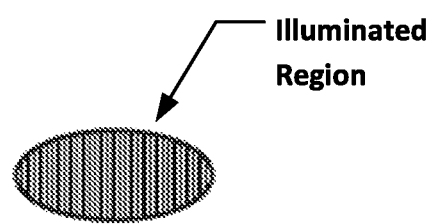
FIG. 9B is an illustration of unobstructed illumination cast onto a surface of the alternate target object of FIG. 9A.
Figure 10:
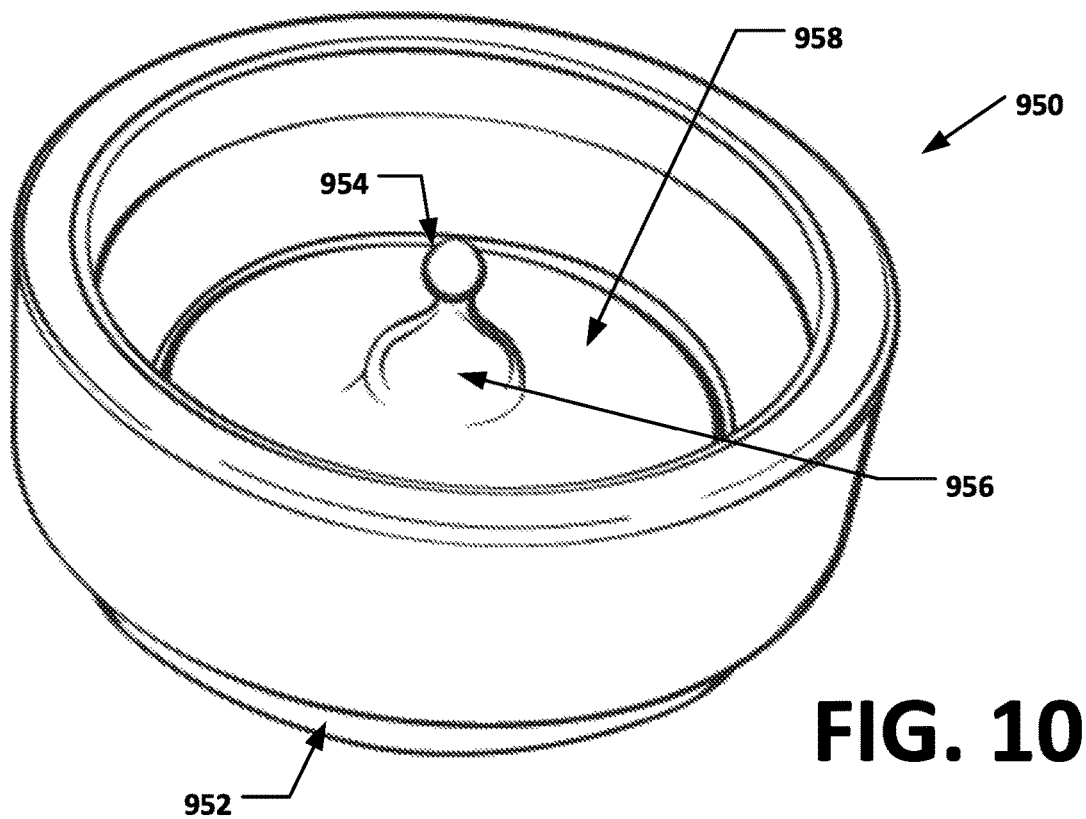
FIG. 10 is a perspective view of the alternate target object of FIG. 9.

Turning to FIGS. 9A and 10, an alternate reference target object 950 is illustrated to aid in the calibration of an optical projector 500a, 500b of a vehicle inspection system 100. The target object 950 consists of an outer body 952 coupled to an inner concentric element 954 by a radial pillar 956. The outer body 952 defines a hollow spherical base segment having a known radial dimension R defining a partially spherical outer surface configured to seat within a fixture or monument, and a partially spherical inner surface 958. The inner concentric element 954 defines a generally spherical body surrounding the center point C of the reference target object 950.

Figure 9C:
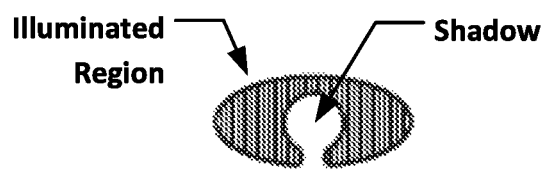
FIG. 9C is an illustration of shadowed illumination cast onto a surface of the alternate target object of FIG. 9A.
Figure 11:
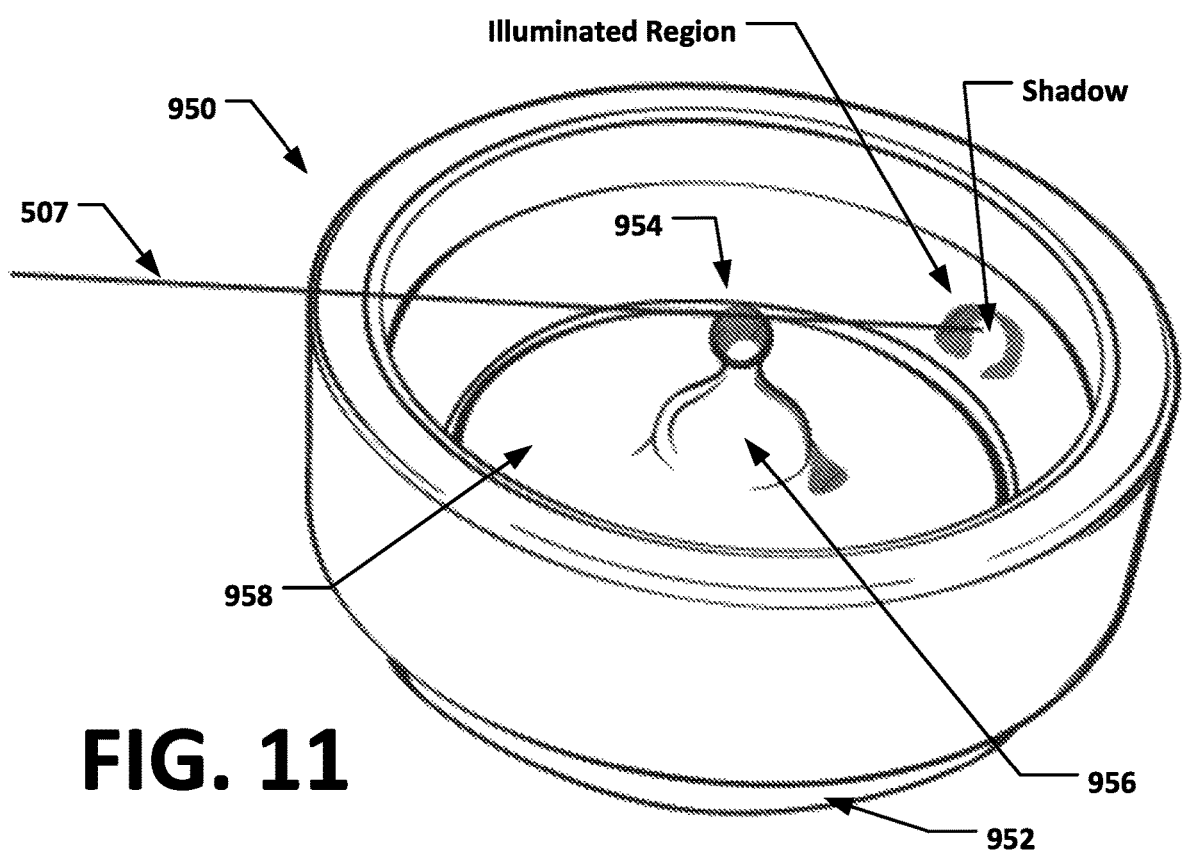
FIG. 11 is a second perspective view of the alternate target object of FIG. 8, in which illumination and shadowing effects are visible indicating axial alignment of a projected laser with a target object center point.

During use, reference target object 950 is placed on a fixture or monument, such that the radial pillar 956 is in a generally vertical orientation. The center point C is a known distance R from the partially spherical outer surface of the outer body 952, and hence is located at a known spatial position relative to the fixture or monument. A focused beam of illumination, such as a laser projected along an axis 507 from an optical projector 500a, 500b is directed at the inner concentric element 954, illuminates a region on the inner surface 958, as seen in FIG. 9B. When the beam of illumination is aligned with inner concentric element 954, a corresponding shadow within the illuminated region is formed of the inner concentric element 954, as seen in FIGS. 9C and 11. Observation of the shadow yields information related to an axial alignment of the illumination. If the shadow is uniformly centered within an illuminated region on the inner surface 958, the illumination is in axial alignment with the center point C. If the shadow is offset, or only partially formed within the illuminated region, the illumination is not in axial alignment with the center point C, and the orientation of the associated optical projector 500a, 500b can be incrementally adjusted as required to achieve axial alignment.

During a calibration procedure for a vehicle inspection system 100, a reference target object 950 is seated on a fixed monument at known location within the operative field of view for an optical projector 500, 500b of the vehicle inspection system 100. The center point C of the reference target object 950 is positioned at a known location in three-dimensional space, determined from the location of the fixed monument and the radial dimension R of the outer body 952. Next, an optical projector 500a, 500b is actuated by the processing system to align projected indicia 501, such as a laser line, with the known location for the center point C of the reference target object 950. Axial orientations for the optical projector 500a, 500b are calculated using the known dimensions of the reference target object 950 together with the known spatial relationship between the vehicle inspection system 100 and the fixed monument. Observation of a resulting shadow of the inner surface 958 of the reference target object 950 yields information related to an axial misalignment of the projected indicia 501. If the shadow of the inner concentric element 954 is uniformly centered within the illuminated region on the inner surface 958, the projected indicia is in axial alignment with the center point C. If the shadow is offset, or only partially formed within the illuminated region, the projected indicia is not in axial alignment with the center point C, and the orientation of the optical projector 500a, 500b is incrementally adjusted as required to achieve axial alignment. The resulting orientation for the optical projector 500a, 500b is recorded in association with the spatial location of the center point C. The procedure is repeated multiple times by placing the reference target object 950 at various monument locations throughout the operative field of view of optical projectors 500a, 500b, establishing a set of data points utilized to refine a 6-DOF transform between the optical projector orientations and selected locations within the vehicle service area.

In a further embodiment of the present disclosure, a spatial relationship between an optical projector 500a, 500b of a vehicle service system 100 and a camera module 104a, 104b of the vehicle service system is determined using a set of reference indicia 606. Initially, the set of reference indicia 606 are disposed in a known or determinable relationship to each other. At least one of the reference indicia 606 is within a field of view of the camera module 104a, 104b, and at least one reference indicia is within an operative area associated with the optical projector 500a, 500b. Images acquired by the camera module 104a, 104b are evaluated to determine a spatial relationship between the camera module the each observed reference indicia 606. Spatial relationships between the camera module and each unobserved reference indicia can be determined using the known relationship between the individual indicia. Correspondingly, the optical projector 500a, 500b is operated to discretely align a projection axis 507 with at least one reference indicia 606 within the operative area, thereby determining a spatial relationship between the optical projector 500a, 500b and the illuminated reference indicia.

Spatial relationships between the optical projectors and each unilluminated reference indicia can be determined using the known relationship between the individual indicia. The determined relationships between the camera modules 104a, 104b and the reference indicia 606, together with the determined relationships between the optical projectors 500a, 500b and the reference indicia 600, are utilized in a coordinate transform to calculate a spatial relationship directly between the camera modules 500a, 500b and the optical projectors 104a, 104b in a common spatial frame of reference. The calculation preferably is in the form of an optimization, such as a Levenberg-Marquardt error-minimizing optimization or other least squares curve fitting algorithm. Alternatively, the coordinate transform is established using over-determined direct methods of relating the projection axis orientations and the reference indicia instead of performing an optimization or curve fitting calculation. Machine learning techniques, such as neural network approaches may be utilized as well to establish transforms between the various reference frames, without departing from the scope of the present invention.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for orienting a projection axis of an optical projector associated with a vehicle inspection system, comprising:

determining a spatial relationship between said optical projector and each of a plurality of reference targets disposed in a common frame of reference;

for each reference target, determining an associated orientation for a projection axis of the optical projection required to align indicia projected along said projection axis with said associated reference target;

using said determined orientations to establish a transform between the projection axis orientations and the spatial locations of each reference target in said common frame of reference;

selecting a spatial location within said common frame of reference for illumination by said optical projector;

calculating, with said transform, an orientation of said projection axis required to direct projected indicia to said selected spatial location; and aligning said projection axis of said optical projector to said calculated orientation.

2. The method of claim 1 wherein said optical projector and said plurality of reference targets are disposed at predetermined locations within said common frame of reference.

3. The method of claim 1 wherein said transform is a six-degree of freedom transformation between rotational orientations for said optical projector about three orthogonal axes and three-dimensional coordinates of spatial locations within said common frame of reference.

4. The method of claim 1 wherein said optical projector is mounted on a set of gimbals for independent rotational movement about at least two rotational axes.

5. The method of claim 1 wherein establishing said transform includes comparing an observed range from said optical projector to at least one reference target with a known or calculated range from said optical projector to said at least one reference target.

6. The method of claim 1 wherein determining said spatial relationship between said optical projector and each of said plurality of reference targets disposed in said common frame of reference includes acquiring at least one image of an optical target associated with said plurality of reference targets, said at least one image acquired by an optical camera in a determinable relationship with said optical projector.

7. A method for calibrating an optical projector to align projected indicia with a selected spatial location within an operative field of view of the optical projector, comprising:

determining a spatial relationship between a projection axis of the optical projector and a plurality of reference targets located within a first portion of said operative field of view of the optical projector;

for each of said plurality of reference targets, determining an associated orientation of said projection axis which aligns said projected indicia with said reference target; and using said determined orientations of said projection axis to establish a transform between said projection axis orientations and a spatial location of each reference target within a common frame of reference.

8. The method of claim 7 further including calculating, with said transform, an orientation for said projection axis to direct projected indicia to a selected spatial location defined within said common frame of reference, and which is within said first portion of said operative field of view.

9. The method of claim 7 wherein determining said orientations of said projection axis to align said projected indicia with each reference target location further includes actuating a multi-axis gimbal supporting said optical projector to orient said projection axis at an orientation calculated to align said projected indicia with a selected reference target location;

projecting said indicia towards said selected reference target location;

observing said projected indicia to identify misalignment between said projected indicia and said selected reference target location;

responsive to said identified misalignment, either (a) operating said multi-axis gimbal to adjust an orientation of said projection axis to align said projected indicia with said selected reference target location to within an acceptable tolerance, or (b) altering said location of said selected reference target to align said projected indicia with said selected reference target to within an acceptable tolerance; and storing said projector axis orientation in association with said selected reference target location.

10. The method of claim 7 wherein determining said spatial relationship between said projection axis and said plurality of reference targets located within a first portion of said operative field of view includes evaluating images of a calibration fixture supporting at least one of said reference targets, said images acquired by an optical camera disposed in a known spatial relationship with said projection axis.

11. The method of claim 10 wherein said calibration fixture includes a set of optical targets; and wherein evaluation of said images of said calibration fixture further includes determining relative positions and/or orientations of each of said optical targets from said acquired images.

12. The method of claim 7 further including determining a spatial relationship between said projection axis and a second plurality of reference targets located within a second portion of said operative field of view of the optical projector;

for each of said second plurality of reference targets, determining an orientation of said projection axis required to align said projected indicia with each reference target location within said second portion of said operative field of view; and wherein said determined orientations of said projection axis associated with each reference target location in the first and second portions of said operative field of view are utilized to establish said transform between said projection axis orientations and the spatial locations of each reference target in said common frame of reference.

13. The method of claim 12 further including altering a spatial position of said optical projector such that said second portion of said operative field of view encompasses said first plurality of reference targets;

wherein determining said at least one orientation of said projection axis to align said projected indicia with each reference target location within said second operative field of view further includes actuating a multi-axis gimbal to alter an orientation of the optical projector to an orientation calculated to align said projected indicia with a selected reference target location;

projecting indicia towards said selected reference target location;

identifying misalignment between said projected indicia and said selected reference target location;

responsive to said identified misalignment, either (a) operating said multi-axis gimbal to adjust an orientation of said projection axis to align said projected indicia with said selected reference target location to within an acceptable tolerance, or (b) altering said location of said selected reference target to align said projected indicia with said selected reference target to within an acceptable tolerance; and storing said projection axis orientation in association with said selected reference target location present within said second portion of said operative field of view.

14. The method of claim 12 wherein said first portion of said operative field of view is a forward-looking portion relative to said optical projector; and wherein said second portion of said operative field of view is a rearward-looking portion relative to said optical projector.

15. The method of claim 12 wherein determining said spatial relationship between said projection axis and said plurality of reference targets in said first portion of said operative field of view includes evaluating images of a first calibration fixture supporting said plurality of reference targets, said images acquired by a set of optical cameras associated with said optical projector; and wherein determining said spatial relationship between said projection axis and said plurality of reference targets within said second portion of said operative field of view includes evaluating images acquired by said set of optical cameras of a second calibration fixture disposed in a determined relationship to said first calibration fixture.

16. The method of claim 15 wherein said optical projector is disposed between said first and second calibration fixtures; and wherein altering said position of said optical projector includes rotating a supporting structure carrying said optical projector about a vertical axis more than 90 degrees and less than 270 degrees.

17. The method of claim 15 wherein said first and second calibration fixtures are each initially adjacent a common side of said vehicle inspection system, within a forward-looking field of view of said set of optical cameras; and wherein altering said position of said supporting structure includes repositioning said supporting structure between said first and second calibration fixtures, together with rotating said supporting structure about a vertical axis more than 90 degrees and less than 270 degrees, such that said first and second calibration fixtures are adjacent opposite sides of said supporting structure with only said second calibration fixture remaining within said forward-looking field of view of said set of optical cameras.

18. A method for calibrating a projection axis of an optical projector mounted to a vehicle inspection system support structure, comprising:

disposing a calibration fixture within a field of illumination for said optical projector, said calibration fixture including at least one optical target and at least one reference target;

observing said calibration fixture with an optical camera system of said vehicle inspection system to acquire image data representative of a spatial relationship between said vehicle inspection system and said calibration fixture;

processing said acquired image data to determining a spatial relationship between said optical projector and said at least one reference target;

altering a spatial orientation of said optical projector to project a visible indicia towards said at least one reference target;

responsive to an observed misalignment between said projected visible indicia and said at least one reference target, refining either said spatial orientation of said optical projector, or a placement of said calibration fixture, until said observed misalignment falls within an acceptable accuracy threshold; and storing data representative of a relationship between said optical projector orientation and a location of said at least one reference target once said observed misalignment is within said acceptable accuracy threshold.

19. The method of claim 18 wherein said steps of processing, altering, and refining are repeated for at least a second reference target on said calibration fixture.

20. The method of claim 18 further wherein said stored data is utilized, together with said spatial relationship between said vehicle inspection system and said calibration fixture, to establish a determinable relationship between any selected location within said field of illumination for said optical projector and an orientation of said optical projector required to project visible indicia onto said selected location.

21. The method of claim 18 wherein said optical projector is mounted to said vehicle inspection system support structure by a multi-axis gimbal system, and wherein altering said spatial orientation of said optical projector includes rotational movement about at least one axis of said multi-axis gimbal system.

22. The method of claim 18 wherein said calibration fixture includes a plurality of reference targets;

wherein said spatial orientation of said optical projector is altered to project a visible indicia towards said at least two reference targets simultaneously;

wherein either said spatial orientation of said optical projector, or a placement of said calibration fixture, is refined until said observed misaligned between said projected visible indicia and said at least two reference targets falls within an acceptable accuracy threshold; and wherein said data representative of a relationship between said optical projector orientation and the locations of said at least two reference targets is stored once said observed misalignment is within said acceptable accuracy threshold.

\* \* \* \* \*